US011460167B2

(12) United States Patent
Miu et al.

(10) Patent No.: US 11,460,167 B2
(45) Date of Patent: Oct. 4, 2022

(54) SENSOR ASSEMBLY FOR MOTOR VEHICLE

(71) Applicant: MAGNA ELECTRONICS INC., Auburn Hills, MI (US)

(72) Inventors: Traian Miu, Oakville (CA); Gabriele Wayne Sabatini, Keswick (CA); Kurt Matthew Schatz, Aurora (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/159,196

(22) Filed: Jan. 27, 2021

(65) Prior Publication Data

US 2021/0148540 A1 May 20, 2021

Related U.S. Application Data

(63) Continuation of application No. 16/802,360, filed on Feb. 26, 2020, now Pat. No. 10,907,794.

(Continued)

(51) Int. Cl.
*B60Q 1/00* (2006.01)
*F21S 45/60* (2018.01)

(Continued)

(52) U.S. Cl.
CPC ............... *F21S 45/60* (2018.01); *F21S 41/29* (2018.01); *H05B 3/84* (2013.01)

(58) Field of Classification Search
CPC ........ B60R 2001/1223; B60R 25/2054; B60Q 1/0023; B60Q 1/50; B60Q 9/00; G01S 7/415; G01S 13/56; G01S 13/343; G01S 7/032; G01S 7/352; G01S 7/417; G01S 2007/356; E05F 15/76; E05F 15/73; B60J 5/10; E05Y 2400/44; E05Y 2400/45; E05Y 2900/546; E05Y 2400/858; E05Y 2900/531; G07C 9/00309; H05K 7/20827; H05K 7/20818; H05K 7/20809; H05K 7/20418; G06V 20/56

See application file for complete search history.

(56) References Cited

U.S. PATENT DOCUMENTS 6,587,573 B1 * 7/2003 Stam ...................... B60Q 1/085 382/104
8,982,559 B2 * 3/2015 Ohsawa .............. H01L 23/3677 257/713

(Continued)

FOREIGN PATENT DOCUMENTS

CN 101389901 A 3/2009
DE 102005027893 B4 * 12/2007 ........... H04N 5/2252

(Continued)

*Primary Examiner* — Omar Rojas Cadima
(74) *Attorney, Agent, or Firm* — Honigman LLP

(57) ABSTRACT

A motor vehicle light assembly includes a housing; a light source disposed in the housing, and a light-transmissive lens operably attached to the housing. A heater member is disposed between the housing and the light-transmissive lens. The heater member is configured to radiate heat emitted from the light source, with the heater member being routed to direct the radiated heat onto the light-transmissive lens to regulate the temperature of the light-transmissive lens to inhibit fogging, frosting and icing of the light-transmissive lens.

19 Claims, 17 Drawing Sheets

Related U.S. Application Data

(60) Provisional application No. 62/811,151, filed on Feb. 27, 2019.

(51) Int. Cl.
*H05B 3/84* (2006.01)
*F21S 41/29* (2018.01)

(56) References Cited

U.S. PATENT DOCUMENTS

| | | | | |
|---|---|---|---|---|
| 10,043,729 | B1 * | 8/2018 | Manninen | H01L 23/4924 |
| 2005/0057542 | A1 | 3/2005 | Plut | |
| 2008/0296926 | A1 * | 12/2008 | Hanzel | H03K 17/941 704/251 |
| 2009/0213613 | A1 * | 8/2009 | Mitic | F21S 45/47 362/547 |
| 2018/0149334 | A1 | 5/2018 | Muehlbauer et al. | |
| 2018/0196501 | A1 * | 7/2018 | Trotta | G06F 3/017 |
| 2019/0154800 | A1 * | 5/2019 | Schmidt | G01S 7/4817 |
| 2019/0162822 | A1 * | 5/2019 | Rafrafi | E05F 15/76 |

FOREIGN PATENT DOCUMENTS

| | | | | | |
|---|---|---|---|---|---|
| JP | 2005239133 | A | * | 9/2005 | |
| KR | 20120089595 | A | * | 8/2012 | G01J 5/041 |

* cited by examiner

FIG. 4A
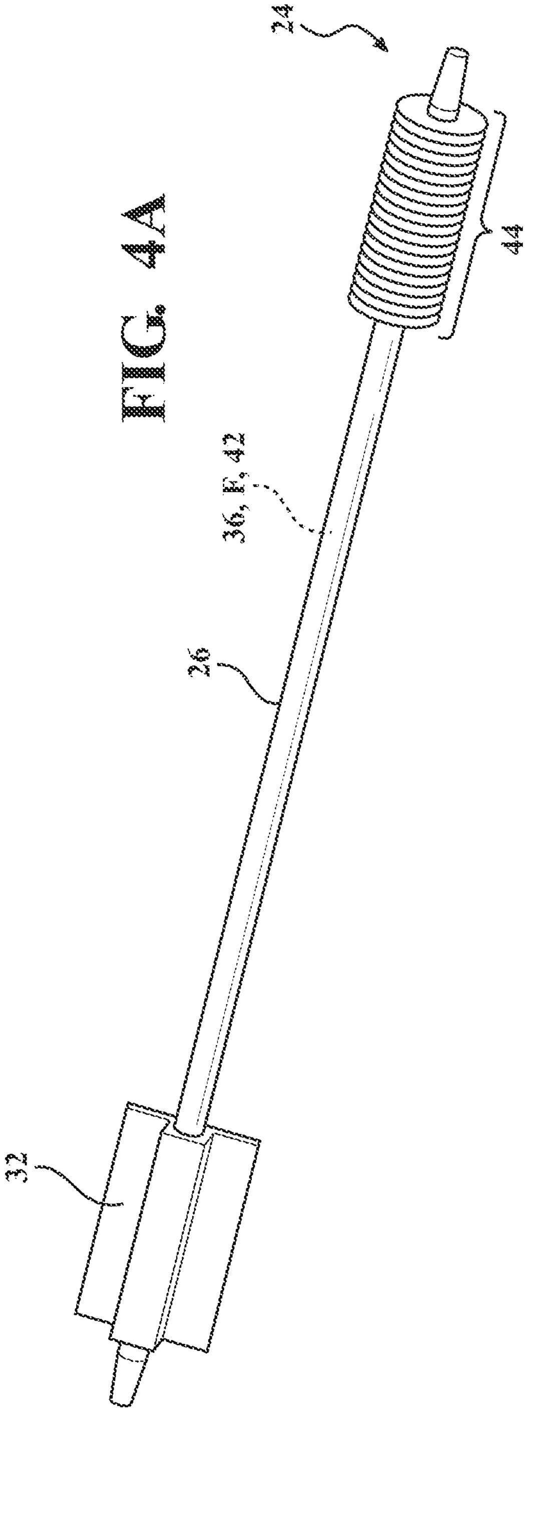
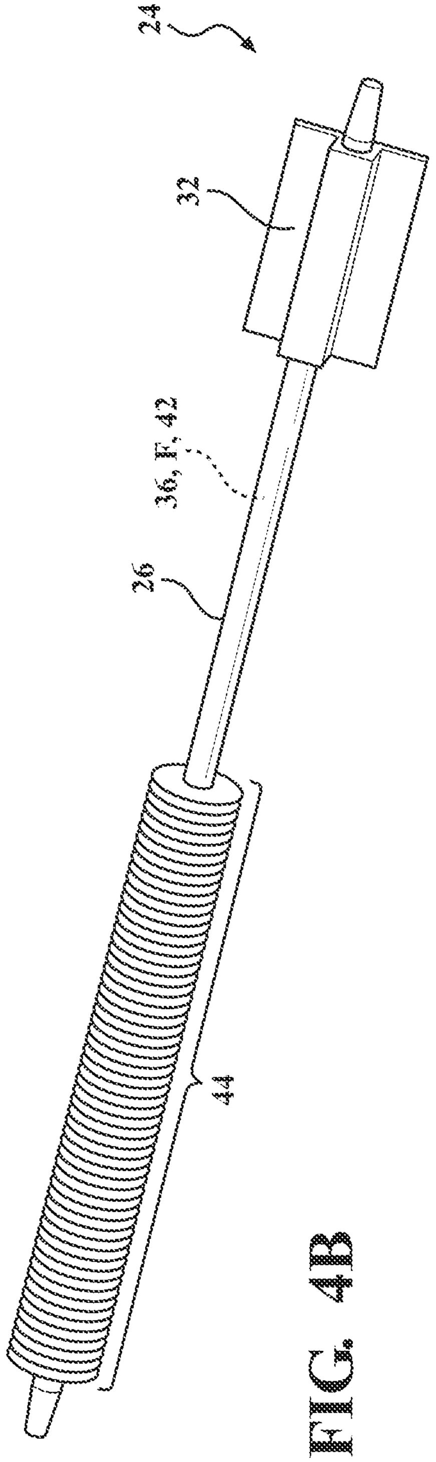
FIG. 4B

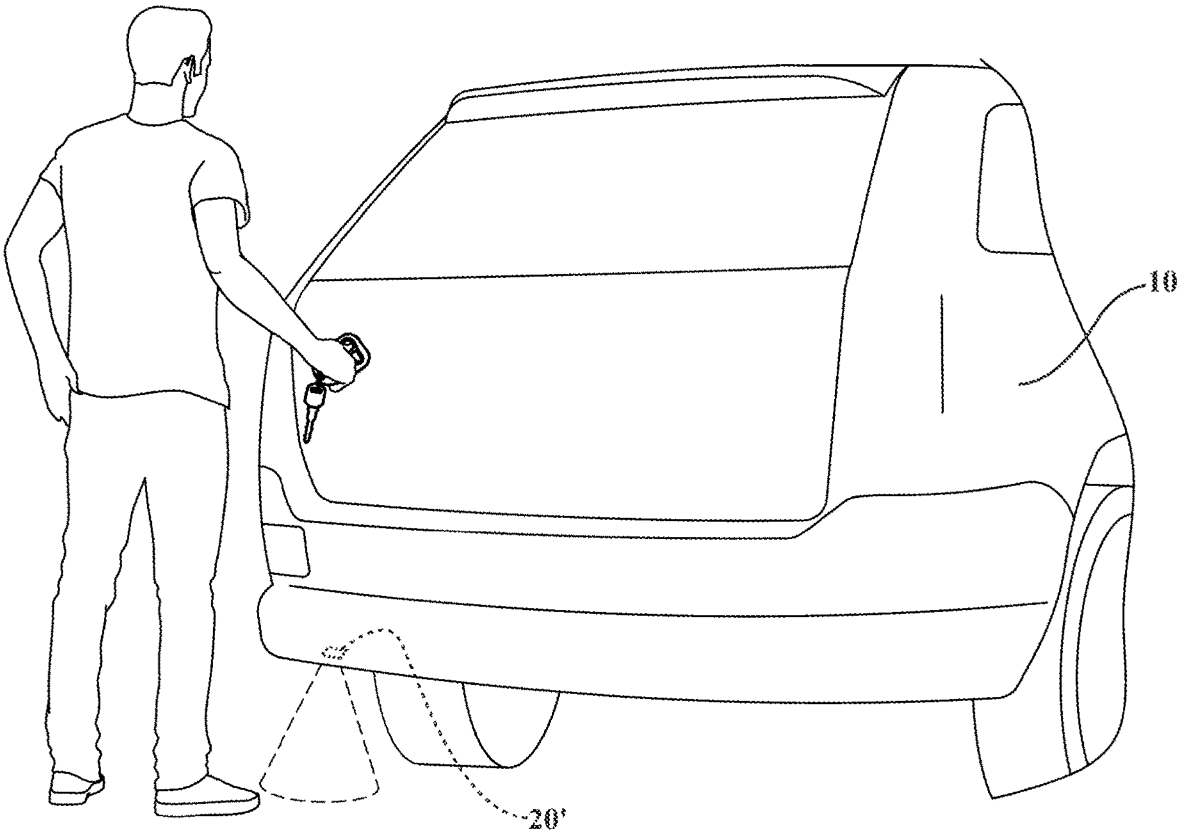
FIG. 13
FIG. 14
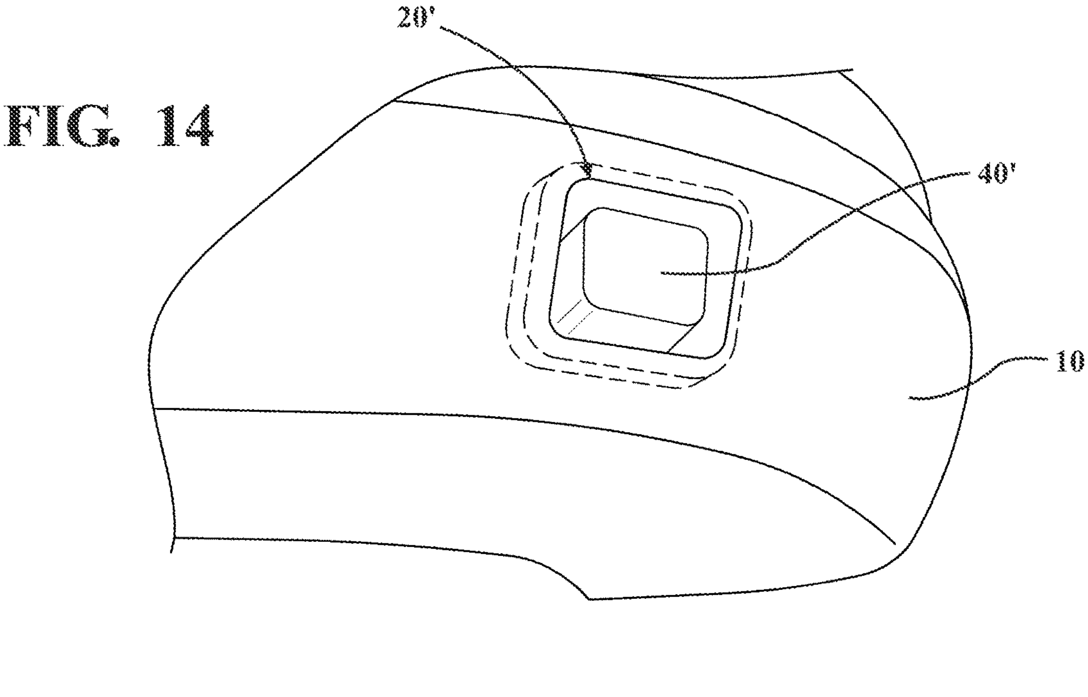

SENSOR ASSEMBLY FOR MOTOR VEHICLE

CROSS-REFERENCE TO RELATED APPLICATION

This application is a continuation of U.S. patent application Ser. No. 16/802,360, filed on Feb. 26, 2020, now U.S. Pat. No. 10,907,794, which claims the benefit of U.S. Provisional Application Ser. No. 62/811,151, filed Feb. 27, 2019, which is incorporated herein by way of reference in its entirety.

FIELD

The present disclosure relates generally to motor vehicle light assemblies, and more particularly, the present disclosure is directed to motor vehicle light assemblies having a radiant heat lens heater.

BACKGROUND

This section provides background information related to the present disclosure which is not necessarily prior art.

Motor vehicle light assemblies, including headlight assemblies, taillight assemblies, directional light assemblies, fog light assemblies, and a daytime running light assemblies are known to include a light source disposed in a housing with a light-transmissive lens operably attached to the housing to allow light emitted from the light source to pass through the light-transmissive lens. The aforementioned light assemblies are known to include incandescent light bulbs or light emitting diodes (LED's), and although the light assemblies are generally suitable for their intended use, they can experience a variety of issues associated with fogging, frost-buildup and ice-buildup on the light-transmissive lens.

In view of the above, there is a need to provide motor vehicle light assemblies that have light-transmissive lenses that are resistant to fogging, frost-buildup and ice-buildup, while at the same time being economical in manufacture and assembly.

SUMMARY

This section provides a general summary of the present disclosure and is not a comprehensive disclosure of its full scope or all of its features, aspects and objectives.

It is an aspect of the present disclosure to provide a motor vehicle light assembly having a light-transmissive lens that is resistant to fogging, to the buildup of frost and to the buildup of ice in reliable and economic fashion.

It is a further aspect of the present disclosure to provide a motor vehicle light assembly having a light-transmissive lens that is able to be defogged, defrosted, and deiced in reliable and economic fashion.

It is an aspect of the present disclosure to provide a motor vehicle light assembly having a lens heater assembly including a heater member that is routed over a predetermined path to optimize the flow of radiant heat toward a light-transmissive lens to render the light-transmissive lens resistant to fogging, to the buildup of frost and to the buildup of ice.

It is a further aspect of the present disclosure to provide a motor vehicle light assembly having a lens heater assembly including a heater member that is routed over a predetermined path to optimize the flow of radiant heat toward a light-transmissive lens to defog, to defrost and to deice the light-transmissive lens.

In accordance with these and other aspects, a motor vehicle light assembly is provided including a housing; a light source disposed in the housing, and a light-transmissive lens, having an inner surface facing toward the light source and an outer surface facing away from the light source, operably attached to the housing to allow light emitted from the light source to pass through the light-transmissive lens. Further, a heater member is disposed between the housing and the light-transmissive lens. The heater member is configured to radiate heat emitted from the light source, with the heater member being precisely routed to direct the radiated heat optimally onto the light-transmissive lens to regulate the temperature of the inner surface and the outer surface of the light-transmissive lens to resist fogging and to defog, to resist frosting and to defrost and to resist icing and deice the light-transmissive lens.

In accordance with another aspect, the heater member can be formed having a tubular wall bounding a cavity to facilitate the flow of radiant heat through the cavity and toward the light-transmissive lens.

In accordance with another aspect, a fluid can be sealed within the cavity of the tubular wall to further facilitate the flow of heat through the cavity and toward the light-transmissive lens.

In accordance with another aspect, a heat conducting wick can be disposed in the cavity of the tubular wall to further facilitate the flow of heat through the cavity and toward the light-transmissive lens.

In accordance with another aspect, a valve can be operably coupled to the heater member, with the valve being selectively moveable between an open state, whereat heat is free to flow into and through the cavity of the heater member, and a closed state, whereat heat is inhibited from flowing into the cavity of the heater member.

In accordance with another aspect, a controller can be configured in operable communication with the valve to facilitate moving the valve between the open state and the closed state to regulate the flow of heat through the heater member.

In accordance with another aspect, a temperature sensor can be configured in operable communication with the controller, with the controller being configured to move the valve between the open state and the closed state in response to an environmental temperature sensed by the temperature sensor. Accordingly, the valve can be automated to open in response to a temperature sensed that would tend to cause fogging, frosting and icing of the light-transmissive lens, and to close when the temperature sensed is not conducive to fogging, frosting and icing of the light-transmissive lens.

In accordance with another aspect, the environmental temperature sensed by the temperature sensor can be at least one or both of an internal environment temperature within the housing and an external environment temperature outside the housing.

In accordance with another aspect, a vent member can be configured to direct heat emitted from the light source to an external environment outside of the housing when the valve is in the closed state, thereby avoiding an undesirable elevated temperature within the motor vehicle light assembly that could otherwise degrade the performance of temperature sensitive components of the motor vehicle light assembly, such as by impacting the optimal performance of components of a printed circuit board, for example.

In accordance with another aspect, the vent member can be operably coupled to the valve, such that the valve acts as a bidirectional valve to direct the flow of heat through the heater member while the valve is in the open state and to direct the flow of heat through the vent member while the valve is in the closed state.

In accordance with another aspect, the heater member can include an elongate member having a plurality of radiator fins extending radially outwardly therefrom, wherein the elongate member can be shaped and routed, and the radiator fins can be strategically located along the elongate member to optimize the flow path of radiant heat to the desired regions of the light-transmissive lens to facilitate maintaining clear, light transmissive properties of the light-transmissive lens.

In accordance with another aspect, the housing can be provided having a plurality of apertures configured to register in alignment with the plurality of radiator fins and the apertures sized so as to conceal the elongate member from direct view through the light-transmissive lens by an observer and to allow the radiated heat to flow through the plurality of apertures onto strategically predetermined regions of the light-transmissive lens.

In accordance with another aspect, the plurality of radiator fins can be clustered in discrete groups, with the discrete groups being spaced from one another to optimize and concentrate the flow of radiant heat onto predetermined regions of the light-transmissive lens.

In accordance with another aspect, at least some of the discrete groups of the radiator fins can include a plurality of the radiator fins spaced from one another by a first distance, with adjacent ones of the discrete groups being spaced from one another by a distance greater than the first distance, thereby further enhancing the ability to optimize and concentrate the flow of radiant heat onto predetermined regions of the light-transmissive lens.

In accordance with another aspect, the elongate member can be formed of a first type of material and the plurality of radiator fins can formed of a second type of material, wherein the first type of material and the second type of material can be different so as to optimize and promote the flow of radiant heat through the cavity of the elongate of the elongate member and outwardly from the radiator fins in economical and efficient fashion.

In accordance with another aspect, the elongate member can be formed of copper and the plurality of radiator fins can formed of a different metal.

In accordance with another aspect, the radiator fins can formed of aluminum.

In accordance with another aspect, the light source can be provided as a LED light source mounted on a printed circuit board, with the printed circuit board being mounted to a support member, and with the heater member being mounted to at least one of the LED light source, the printed circuit board and the support member.

In accordance with another aspect, a mount adaptor can be fixed to at least one of the printed circuit board and the support member, with the heater member being fixed to the mount adaptor to facilitate the flow of heat toward the heater member.

In accordance with another aspect, the mount adaptor can be formed of a thermally conductive metal material to facilitate the flow of heat from the LED light source to the heater member.

In accordance with another aspect, the motor vehicle light assembly can include at least one of a headlight assembly, a taillight assembly, a directional light, a fog light, and a daytime running light.

In accordance with another aspect, a method of inhibiting fogging, frosting and/or icing of a light-transmissive lens of a motor vehicle light assembly is provided. The method includes routing a heater member within a housing of the motor vehicle light assembly and configuring a first end portion of the heater member to be in close proximity with a light source of the motor vehicle light assembly and a second end portion of the heater member to be in close proximity with a light-transmissive lens of the motor vehicle light assembly to promote the transfer of radiant heat from the light source to the light-transmissive lens.

In accordance with another aspect, the method can further include routing the second end portion of the heater member to extend along and adjacent a lowermost edge of the light-transmissive lens, thereby promoting radiant heat to rise into thermal contact with an entirety or substantial entirety of the light-transmissive lens, thus, assuring the entirety or substantial entirety of the light-transmissive lens remains defogged, defrosted and deiced while at the same time concealing the heater member from view through the light-transmissive lens by an observer and keeping the heater member from obstructing light emitted from the light source from passing through the light-transmissive lens.

In accordance with another aspect, the method can further include providing radiator fins extending radially outwardly from an outer surface of the heater member to optimize the transfer of radiant heat onto the light-transmissive lens.

In accordance with another aspect, the method can further include forming discrete groups of the radiator fins and spacing the discrete groups from one another along a length of the heater member to further optimize the transfer of radiant heat to desired locations of the light-transmissive lens.

In accordance with another aspect, the method can further include operably coupling a valve to the heater member and configuring the valve to be selectively moveable between an open state, whereat heat is free to flow through the heater member to the light-transmissive lens, and a closed state, whereat heat is inhibited from flowing through the heater member to the light-transmissive lens.

In accordance with another aspect, the method can further include configuring a controller in operable communication with the valve to move the valve between the open state and the closed state.

In accordance with another aspect, the method can further include configuring a temperature sensor in operable communication with the controller and configuring the controller to move the valve between the open state and the closed state in response to an environmental temperature sensed by the temperature sensor.

In accordance with another aspect, the method can further include configuring a vent member to promote the free transfer of heat emitted from the light source to an external environment outside of the housing when the valve is in the closed state, thereby avoiding an undesirable elevated temperature within the motor vehicle light assembly that could otherwise degrade the performance of the motor vehicle light assembly, such as by impacting the optimal performance of components of a printed circuit board, for example.

In accordance with another aspect, the method can further include operably coupling the vent member to the valve, thereby regulating the optimal temperature within the housing with a single valve, and thus, enhancing the ability to inhibit fogging, frosting and/or icing of the light-transmissive lens in and economical, reliable fashion.

In accordance with another aspect, there is provided a sensor assembly, including a housing, a sensor disposed in the housing and including a processor configured for processing signals detected by the sensor, wherein the processing causes the processor to generate heat; and a heater member disposed in the housing, the heater member being routed to radiate heat generated by the processor to an exterior of the housing to regulate the temperature of processor. In accordance with a related aspect, the sensor is a radar sensor and the processor is configured for processing radar signals detected by the radar sensor. In a related aspect, the housing is a sealed housing. In a related aspect, the heat member is a heat pipe.

In accordance with another aspect, there is provided a motor vehicle electronic module, including a housing, an electronic device as a source of heat disposed in the housing, and a heat pipe in communication, such as thermally coupled, with the electronic device, the heater member being routed to radiate heat emitted from the electronic device to an exterior of the housing.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings, wherein:

FIGS. 4A-4D illustrate lens heater assemblies in accordance with various non-limiting aspects of the disclosure;

FIG. 13 illustrates a side rear view of a motor vehicle equipped with an electronic module housing a sensor and a heater member, in accordance with an exemplary configuration of the teachings herein;

FIG. 14 illustrates a close up view of the bumper of the motor vehicle of FIG. 13 equipped with an electronic module housing a sensor and a heater member, in accordance with an exemplary configuration of the teachings herein;

DETAILED DESCRIPTION OF EXAMPLE EMBODIMENTS

Figure 1:
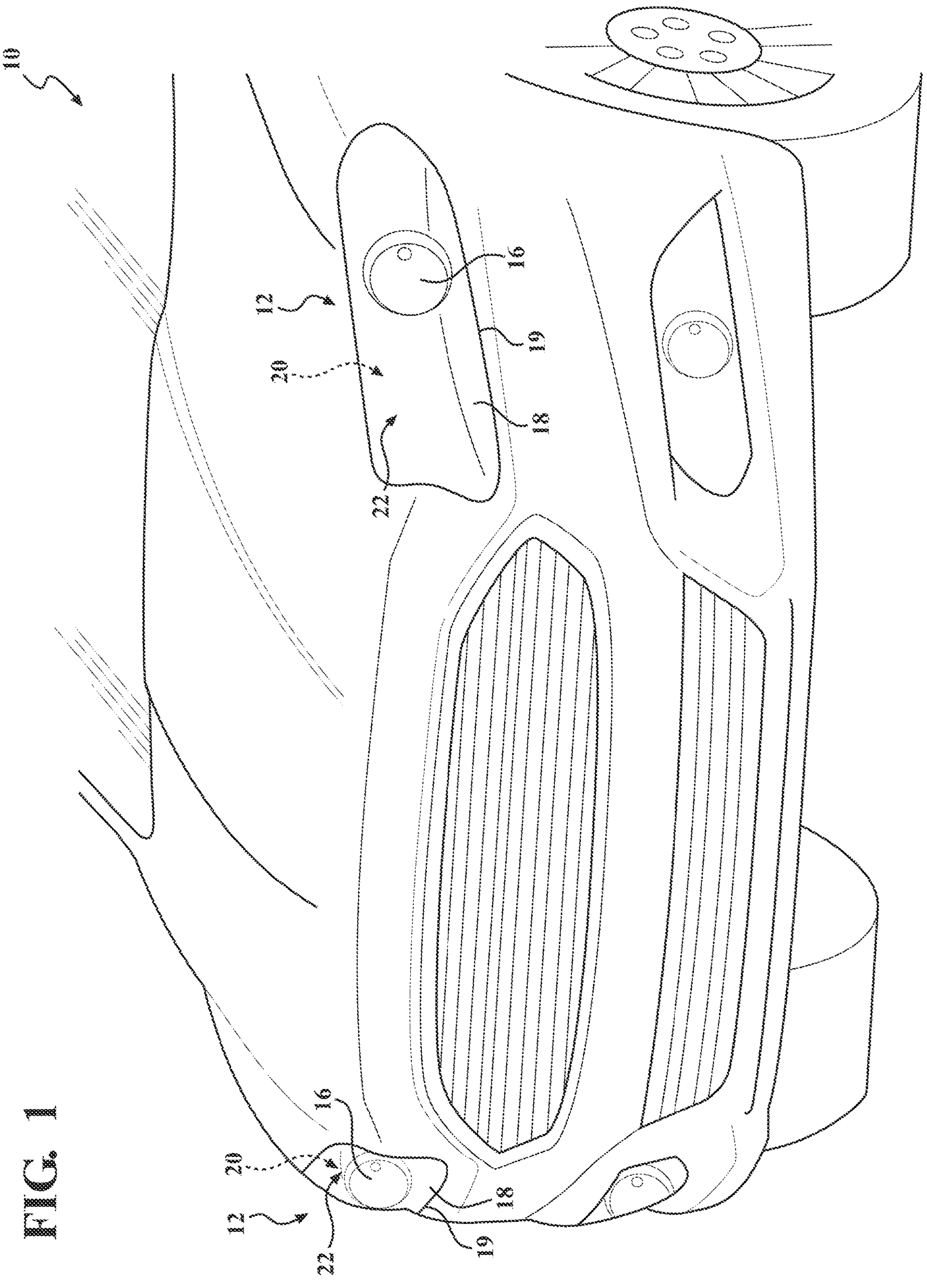
FIG. 1 is perspective partial view of a motor vehicle having a motor vehicle light assembly constructed in accordance with one aspect of the disclosure.

In general, example embodiments of motor vehicle light assemblies having a lens heater assembly constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring in more detail to the drawings, FIG. 1 illustrates a motor vehicle 10 having a motor vehicle light assembly, referred to hereafter as light assembly 12, constructed in accordance with an aspect of the disclosure. The light assembly 12 illustrated is a headlight assembly, though it is to be understood that other light assemblies are contemplated and within the scope of the disclosure, such as taillight, directional light, fog light, and daytime running light assemblies, by way of example and without limitation. The light assembly 12 includes a housing 14 with at least one, and shown as a plurality of light sources 16 disposed therein. Further, a light-transmissive lens, referred to hereafter as lens 18, having an inner surface 20 facing toward the light source 16 and an outer surface 22 facing away from the light source 16, is operably attached to the housing 14 to allow light emitted from the light source 16 to pass through the lens 18 for desired illumination. Further, in accordance with an aspect of the disclosure, a lens heater assembly 24 having at least one heater member 26 is disposed between the housing 14 and the light-transmissive lens 18. The heater member 26 is configured to transfer and radiate heat emitted from at least one light source 16, with the heater member 26 being precisely routed, as desired, to direct the heat transferred and radiated from the heater member 26 optimally onto the intended regions of the lens 18, thereby causing the temperature of the inner surface 20 and the outer surface 22 of the lens 18 to be regulated to best resist fogging and to defog, to resist frosting and to defrost and to resist icing and deice the lens 18. The heat emitted from at least one light source 16 may include heat generated by the LEDs or the electronics driving the LEDS, such as LED driver integrated circuits (ICs). Accordingly, the heat member assembly 24 may be coupled directly to such sources of heat e.g. to a flat portion of a chip, or indirectly to the source of heat, such as to a structure coupled to the source of heat, for example to the printed circuit board supporting the LED driver IC and/or the LEDs. Accordingly, the heat member assembly 24, with the heater member 26 being routed to optimally transfer heat to the lens 18, provides an ability to maximize the illumination efficiency of the light assembly 12 regardless of the environmental conditions of the external environment E, such as snow, frozen sleet, rain, humidity, or any other environment conditions that would ordinarily cause the lens 18 to become fogged, frosted or iced over.

The housing 14 can be constructed of any suitable metal or plastic material, can configured to take on any suitable shape. Housing 14 is shown sized to accommodate at least one or more printed circuit board (PCB) 28, at least one or more lens heater assembly 24 and at least one or more light sources 16 therein.

At least some of the illustrated light sources 16 are, by way of example and without limitation, illustrated as LED light sources 16 mounted on a PCB 28. The PCB 28 is shown, by way of example and without limitation, mounted to a support member, such as a heat-sink support member 30 constructed of suitable heat-sink material, as will be understood by one possessing ordinary skill in the art. The heater member 26 can be mounted to at least one of the LED light source 16, the PCB 28 and/or the support member 30. To facilitate mounting the heater member 26, a mount adaptor 32 can be fixed to at least one of the PCB 28 and/or the support member 30, with the heat member 26 being fixed to the mount adaptor 32. Mount adaptor 32 is preferably constructed of a thermally conductive, lightweight metal material, such as aluminum, by way of example and without limitation.

Figure 8:
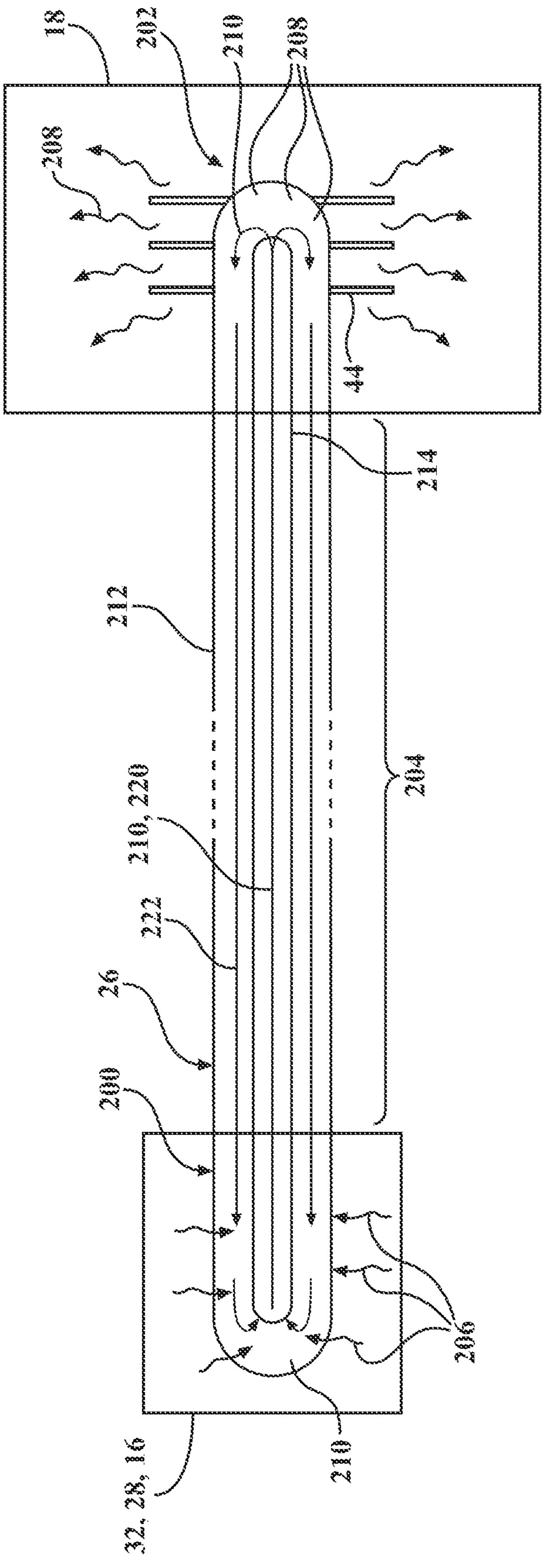
FIG. 8 illustrates a cross-sectional view of a heater member illustrating the flow of fluid transferring heat from an LED to a lens of a motor vehicle light assembly, in accordance with another non-limiting embodiment.

The heater member 26 is constructed as an elongate member, and can be formed having a tubular wall 34 bounding a cavity 36, with the cavity 36 extending between opposite closed and sealed first and second end portions, referred to hereafter as ends 38, 40. The heater member 26 is constructed of a thermally conductive material, and in accordance with one aspect, copper, by way of example and without limitation. It is to be understood that other thermally conductive metals could be used, such as aluminum or steel, for example. With the ends 38, 40 being closed and sealed, the cavity 36 defines an encapsulated, enclosed system, such that fluid F can be disposed and sealed within the cavity 36 to facilitate heat transfer from end 38 toward end 40, such as water, for example. To further facilitate heat transfer from end 38 toward end 40, a wicking material, referred to as wick 42, such as a sintered material or felt, by way of example and without limitation, can be disposed within cavity 36. With reference to FIG. 8, in accordance with an illustrative example, the heater member 26 includes a first end 200 disposed adjacent a heat source, such as the mount adaptor 32, the PCB 28, or adjacent the light source 16, and a second end 202 disposed adjacent a portion of the housing 14, such as lens 18, and a middle section 204 interconnecting the first end 200 and the second end 202. Middle section 204 can include bends, turns or curves formed to position through the housing 14 cavity as required from the heat source to capture heat 206 from the desired area of the housing 14 to transfer radiant heat 208 to the desired area. A heat transfer liquid medium, referred to hereafter as fluid 210, can be contained within the heater member 26 by a sealed outer wall 212 that houses the fluid 210. Additionally, a wick core, also referred to as wick 214, can be housed within the heater member 26 to further facilitate the desired transfer of heat from the first end 200 to the second end 202. Fluid 210 that is heated at the first end 200 can be transformed into a vapor state as it receives heat generated by the adjacent heat source. Fluid 210 in vapor form (heated fluid 220) then travels through the wick 214 towards the second end 202, and is condensed into a fluid state at the second end 202 causing heat 208 to be released therefrom. Fluid 210 then travels in a cooled form (cooled fluid 222) by capillary action through the wick 214 towards the first end 202, where the cycle is repeated. Heat 208 transfers through the outer wall 212 and may be further dissipated by radiator fins 44 mounted to the outer wall 212.

Figure 3:
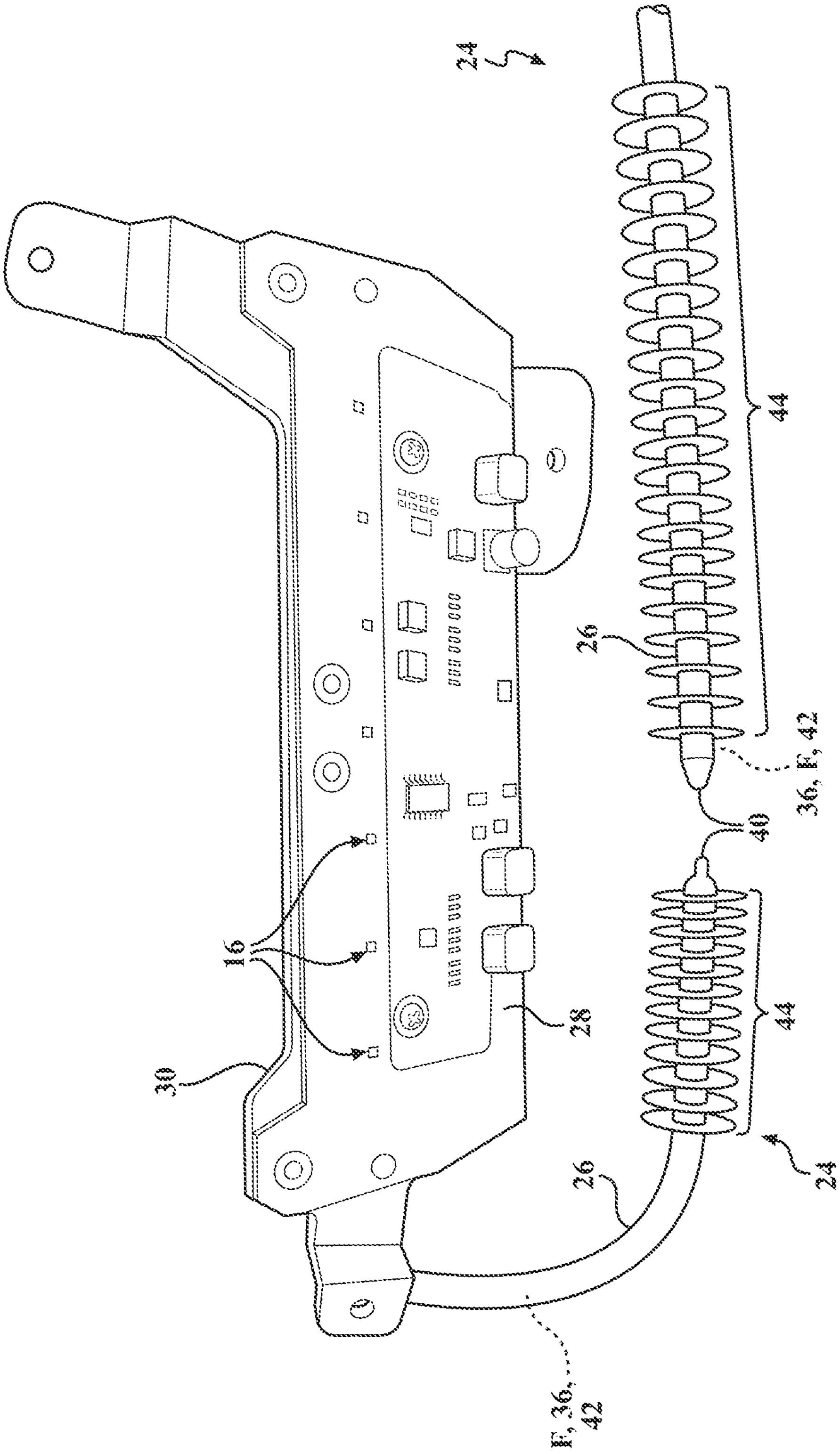
FIG. 3 is a perspective view illustrating a lens heater assembly mounted to a support member of a printed circuit board of a motor vehicle light assembly in accordance with another non-limiting aspect of the disclosure.
Figure 3A:
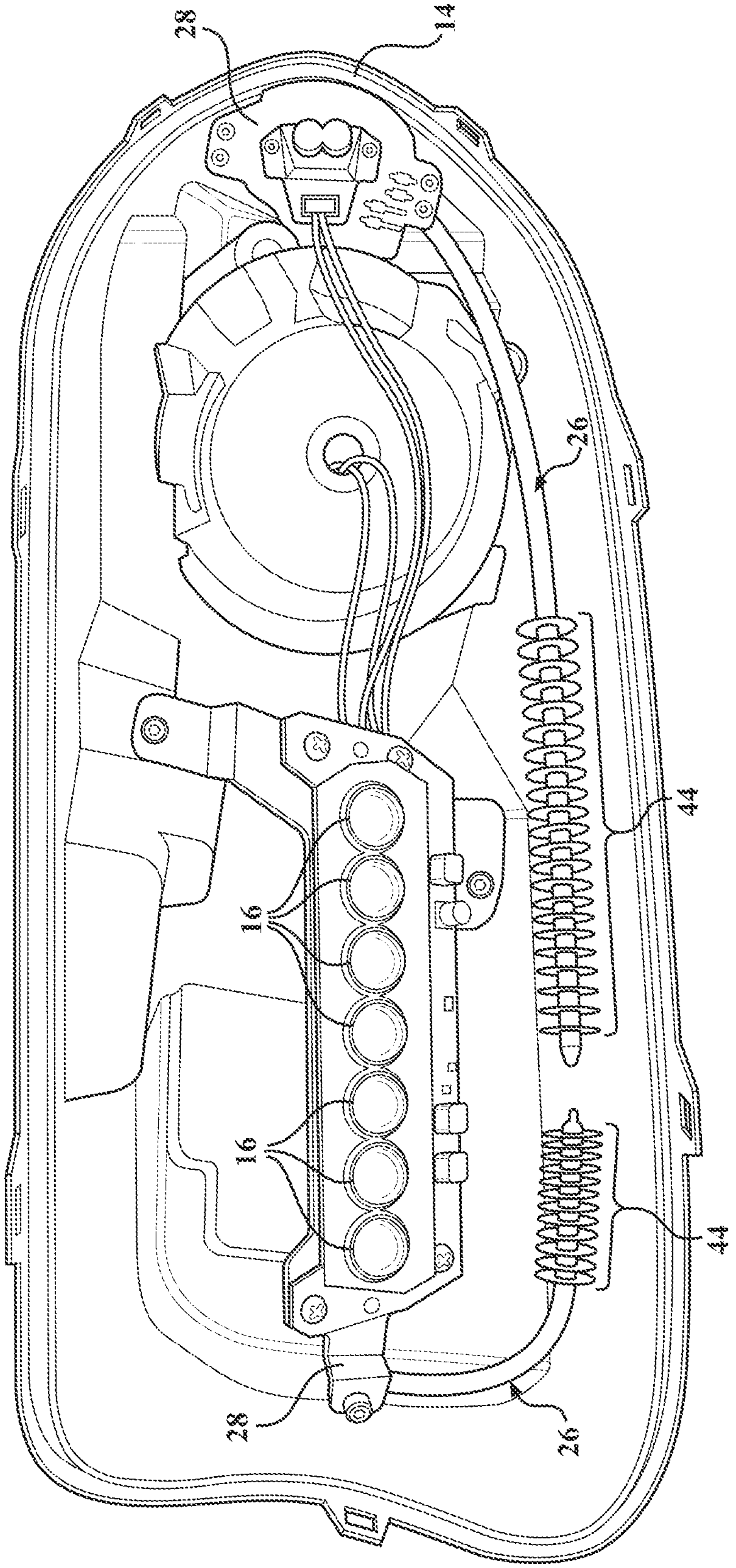
FIG. 3A is a view similar to FIG. 3 illustrating a lens heater assembly and printed circuit board disposed in a housing.
Figure 4C:
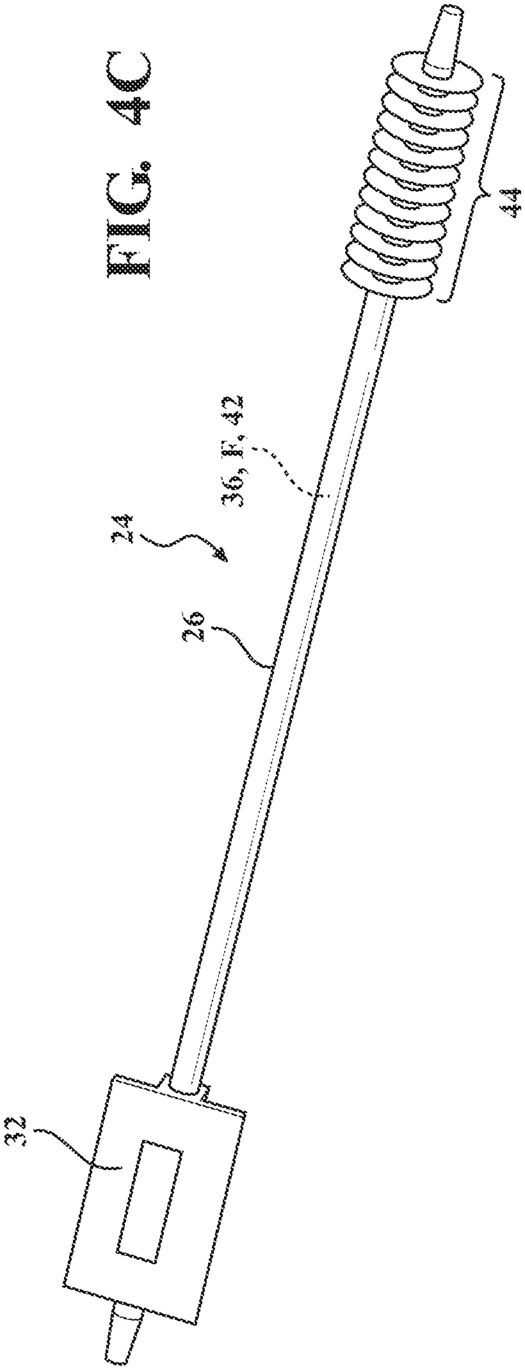
Figure 4D:
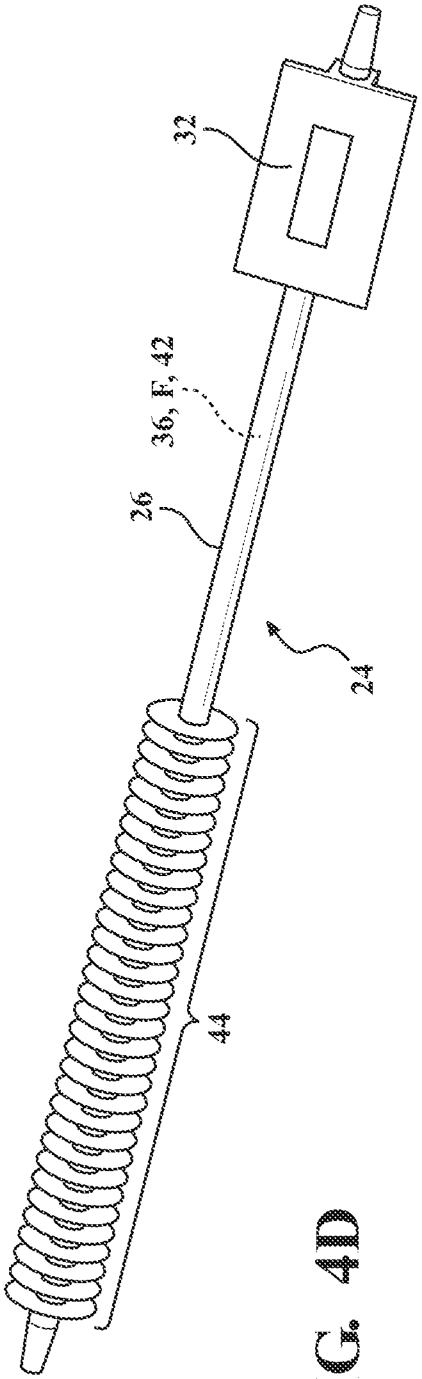

Further yet, a plurality of radiator fins 44 extending radially outwardly from the tubular wall 34. The radiator fins 44 can be attached to the tubular wall 34 as individual members (FIG. 3), such as via interference fit and/or suitable high temperature adhesive or weld joint, or the radiator fins 44 can be formed as a plurality of radiator fins 44 fixed to a common tubular support 46, such that the tubular support 46 and radiator fins 44 extending radially outwardly therefrom are constructed as a monolithic piece of material. The tubular support 46 can have an open through cavity sized to slide in close fit, slightly loose relation over an outer surface of tubular wall 34 for subsequent fixation thereto, such as via suitable high temperature adhesive, mechanical fastener and/or weld joint. The radiator fins 44 and tubular support 46 can be constructed of any suitable heat-radiating material, such as aluminum, by way of example and without limitation. Accordingly, the tubular wall 34 can be constructed from a first material and the radiator fins 44 can be constructed from a second material, wherein the first material is different from the second material.

Figure 2:
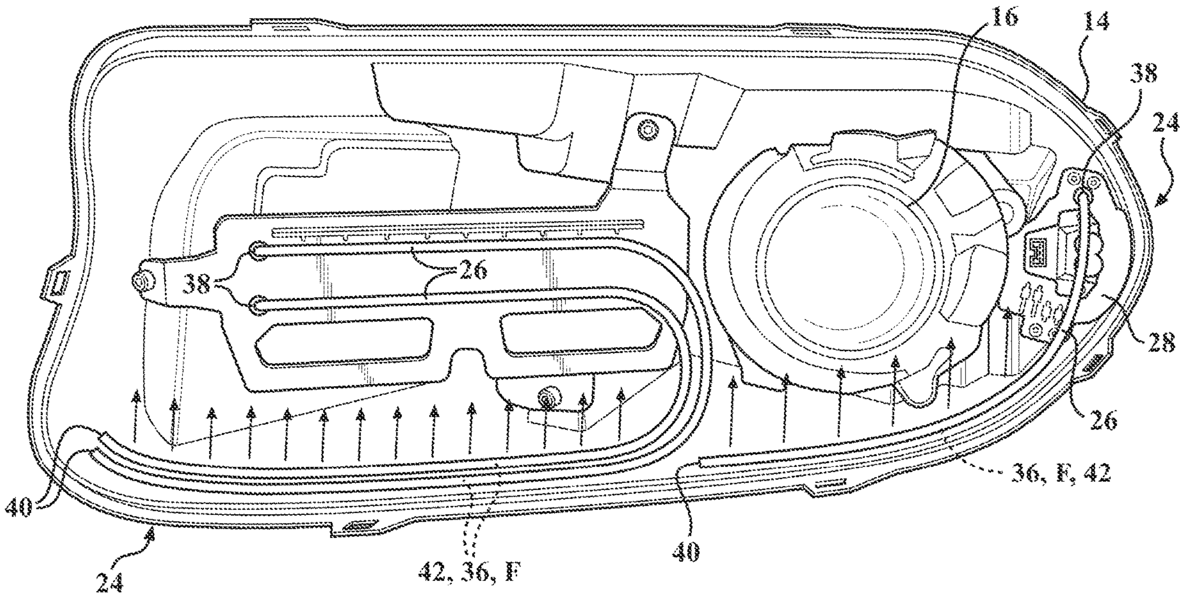
FIG. 2 is front elevation view of the motor vehicle light assembly of the motor vehicle of FIG. 1 with a light-transmissive lens removed therefrom for clarity purposes only.
Figure 2A:
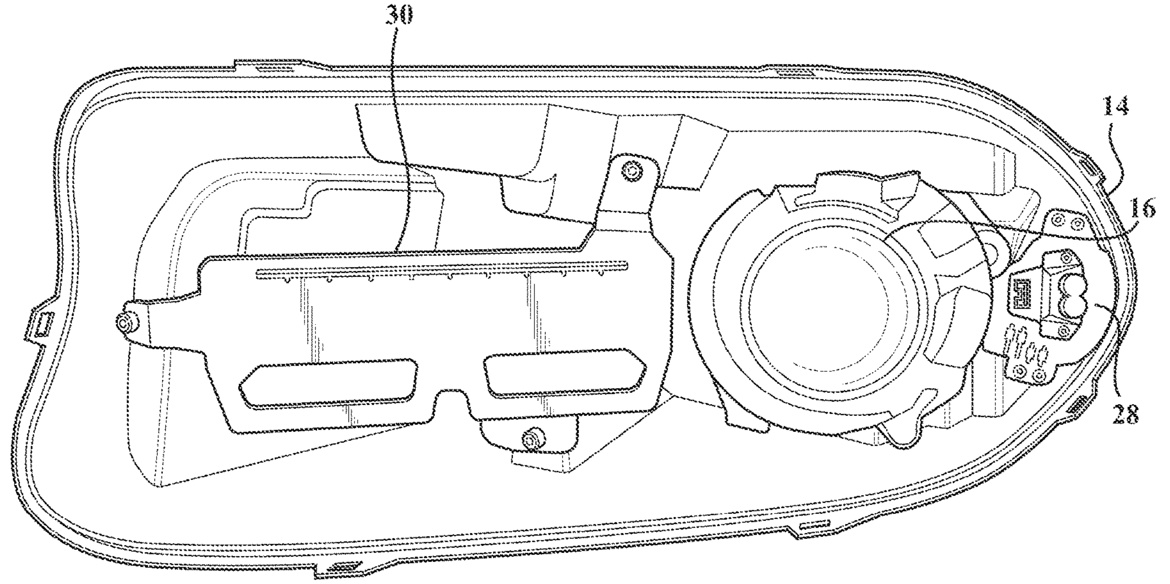
FIG. 2A is a view similar to FIG. 2 with a lens heater member removed from the motor vehicle light assembly for further clarity purposes only.

As shown schematically in FIG. 2, the tubular wall 34 of the heater member can be routed into close proximity with the inner surface 20 of the lens 18, and in particular, can be routed to extend along and adjacent a lowermost edge 19 of the lens 18. As such, the heat radiated from the radiator fins 44, illustrated by upwardly pointing arrows, can rise along the entirety of the inner surface 20, thereby optimizing the ability to defog, defrost and deice the lens 18.

Figure 5:
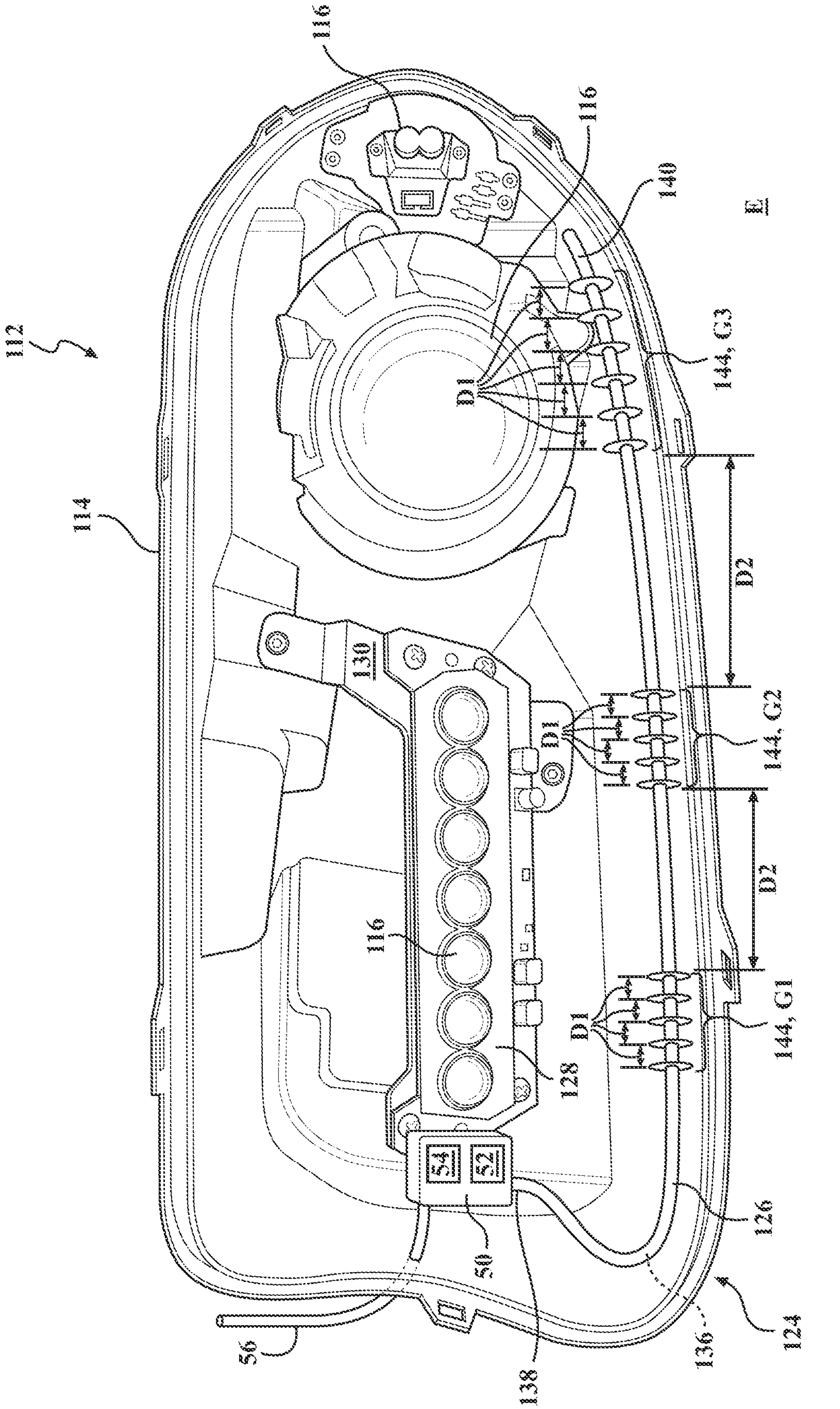
FIG. 5 is a view similar to FIG. 3A schematically illustrating a lens heater assembly of a motor vehicle light assembly in accordance with another non-limiting aspect of the disclosure.
Figure 6:
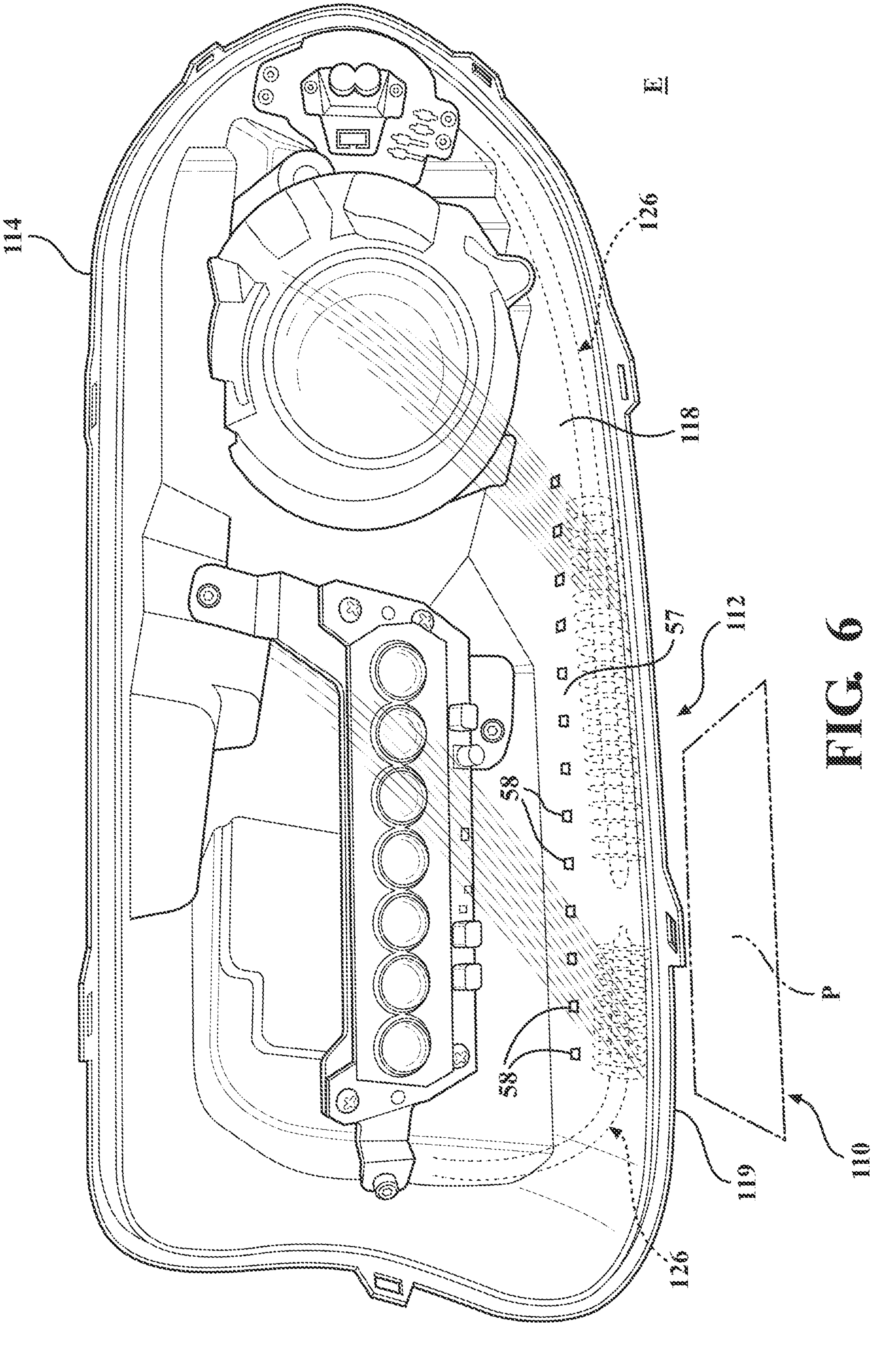
FIG. 6 is a view similar to FIG. 1 of a motor vehicle light assembly including the lens heater assembly and printed circuit board of FIG. 5.

As shown in FIGS. 5 and 6, a light assembly 112 of a motor vehicle 110 in accordance with another aspect of the disclosure is shown, wherein the same reference numerals, offset by a factor of 100, are used to identify like features.

The light assembly 112 has a lens heater assembly 124 including a heater member 126, a PCB 128, a support member 130, and a plurality of radiator fins 144 disposed about the heater member 126, the radiator fins 144 extending radially outwardly from the heater member 126. In accordance with a further aspect, the radiator fins 144 are shown clustered in discrete clusters, also referred to as groups G1, G2, G3, spaced from one another. The groups G1, G2, G3 are each shown including a plurality of the radiator fins 144 spaced from one another within each group G1, G2, G3 by a first distance D1, while adjacent groups G1, G2, and G2, G3 are spaced from one another by a second distance D2, wherein D1 is less than D2. It is to be recognized that the radiator fins 144 and separate groups G1, G2, G3 can be spaced from one another by any suitable distances, as desired, to attain the radiant heat flow pattern desired for the intended application.

The lens heater assembly 124 further includes a valve 50 operably coupled to a first end portion, also referred to as an inlet end 138, of the heater member 126. The valve 50 is selectively moveable between an open state, whereat heat is free to flow into a cavity 136 of the heater member 126 to a second end portion 140, and a closed state, whereat heat is inhibited from flowing into the cavity 136 of the heater member 126. To facilitate opening and closing the valve 50, a controller 52 can be configured in operable communication with the valve 50 to move the valve between the open state and the closed state, such as in response to a temperature sensed by a temperature sensor 54 configured in operable communication with the controller 52, shown schematically as being contained within the controller 52. Accordingly, the controller 52 is configured to move the valve 50 between the open state and the closed state in response to an environmental temperature sensed by the temperature sensor 54, wherein the environmental temperature is at least one of an internal environment temperature within a housing 114 of the light assembly 112 and an external environment E temperature outside the housing 114.

The lens heater assembly 124 can further include a vent member 56 configured to carry and direct heat emitted from the light source 116 to the external environment E outside the housing 114 when the valve 50 is in the closed state. The vent member 56 is shown operably coupled to the valve 50, such that the valve 50 functions as a bi-directional valve to either direct heat through the cavity 136 of heater member 126, such as during winter, or through vent member 56, such as during summer, wherein vent member 56 can be provided, in a non-limiting embodiment, as a tubular member having an open end to allow the heat flow therethrough to flow freely to the external environment E.

In accordance with yet another aspect, the housing 114 or decorative lowermost floor or partition 57 (FIG. 6) of the housing 114, such as may be visibly seen from the external environment E though lens 118, can be provided having a plurality of apertures 58 configured to register in alignment with the plurality of radiator fins 144 to allow the radiated heat 99 to flow through the plurality of apertures 58 onto predetermined regions of the light-transmissive lens 118. The heater member 126 can be routed beneath the decorative floor or partition so that it is concealed and not visible to an observer from the external environment E, while only the fins 144, such as the discrete clusters, bundles or groups G1, G2, G3 of fins 114 can be seen through the apertures 58, if at all. Accordingly, it is to be recognized that the apertures 58 can be precisely sized to register with and expose only the fins 144 of the groups G1, G2, G3 of fins 114, while the remaining portion of the heater member 126 remains concealed and hidden from view beneath the partition 57 of the housing 114. It is to be further recognized that the heater member 126 and fins 114 are located in near proximity to, and preferably below a lowermost horizontal plane P passing through a lowermost edge 119 of the lens 118, thereby allowing the radiated heat to rise into thermal contact with the entirety of the lens 118 to provide optimal heating, anti-fogging, anti-frosting and anti-icing thereof.

Figure 7:
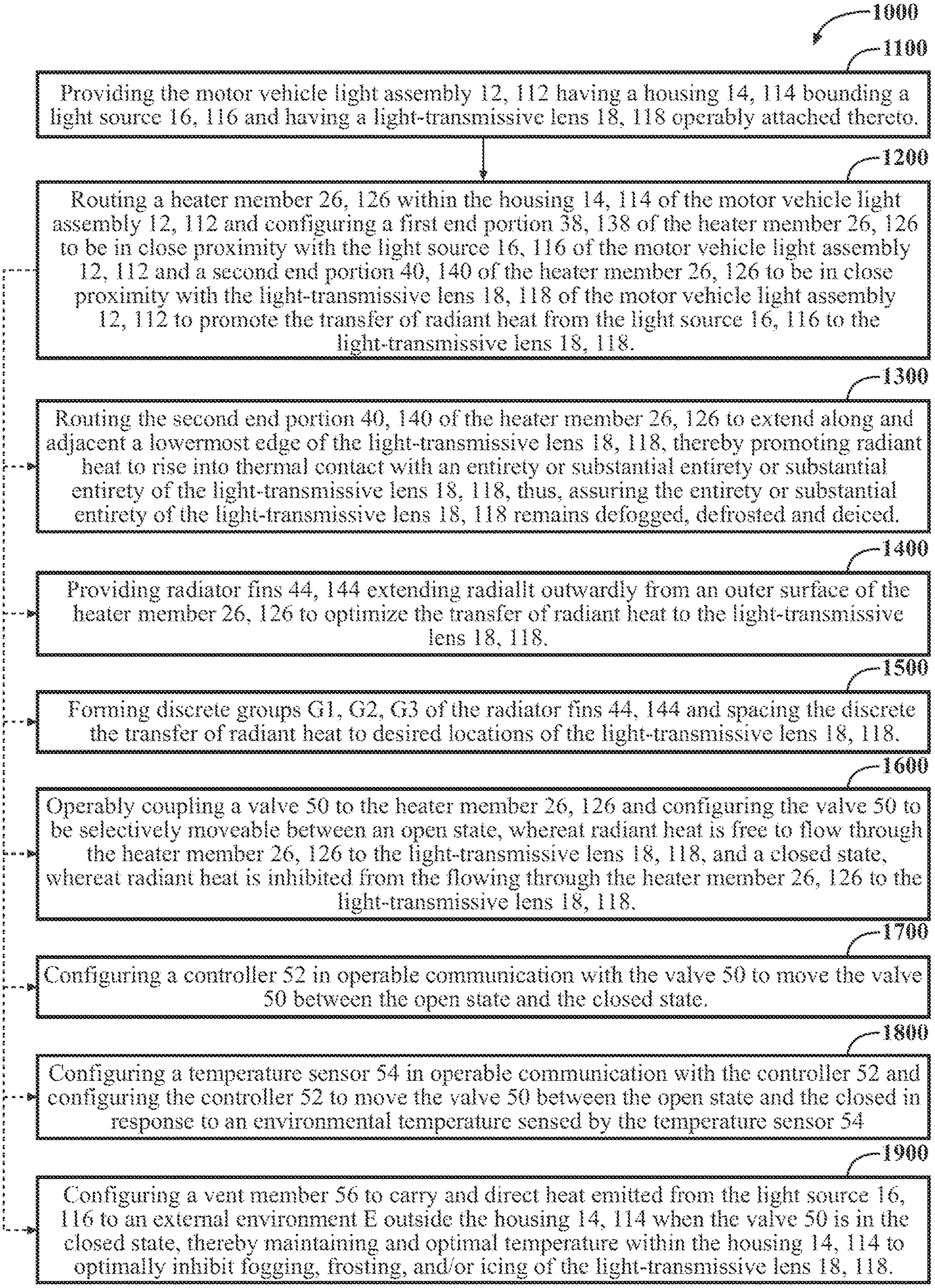
FIG. 7 illustrates a flow chart of a method for inhibiting fogging, frosting and/or icing of a light-transmissive lens of a motor vehicle light assembly.

In accordance with a further aspect, as illustrated in FIG. 7, a method 1000 of inhibiting fogging, frosting and/or icing of a light-transmissive lens of a motor vehicle light assembly 12, 112 is provided. The method 1000 includes a step 1100 of providing the motor vehicle light assembly 12, 112 having a housing 14, 114 bounding a light source 16, 116 and having a light-transmissive lens 18, 118 operably attached thereto. The method 1000 further includes a step 1200 of routing a heater member 26, 126 within the housing 14, 114 of the motor vehicle light assembly 12, 112 and configuring a first end portion 38, 138 of the heater member 26, 126 to be in close proximity with the light source 16, 116 of the motor vehicle light assembly 12, 112 and a second end portion 40, 140 of the heater member 26, 126 to be in close proximity with the light-transmissive lens 18, 118 of the motor vehicle light assembly 12, 112 to promote the transfer of radiant heat from the light source 16, 116 to the light-transmissive lens 18, 118.

In accordance with another aspect, the method 1000 can further include a step 1300 of routing the second end portion 40, 140 of the heater member 26, 126 to extend along and adjacent a lowermost edge of the light-transmissive lens 18, 118, thereby promoting radiant heat to rise into thermal contact with an entirety or substantial entirety of the light-transmissive lens 18, 118, thus, assuring the entirety or substantial entirety of the light-transmissive lens 18, 118 remains defogged, defrosted and deiced.

In accordance with another aspect, the method 1000 can further include a step 1400 of providing radiator fins 44, 144 extending radially outwardly from an outer surface of the heater member 26, 126 to optimize the transfer of radiant heat to the light-transmissive lens 18, 118.

In accordance with another aspect, the method 1000 can further include a step 1500 of forming discrete groups G1, G2, G3 of the radiator fins 44, 144 and spacing the discrete groups G1, G2, G3 from one another along a length of the heater member 26, 126 to further optimize the transfer of radiant heat to desired locations of the light-transmissive lens 18, 118.

In accordance with another aspect, the method 1000 can further include a step 1600 of operably coupling a valve 50 to the heater member 26, 126 and configuring the valve 50 to be selectively moveable between an open state, whereat radiant heat is free to flow through the heater member 26, 126 to the light-transmissive lens 18, 118, and a closed state, whereat radiant heat is inhibited from flowing through the heater member 26, 126 to the light-transmissive lens 18, 118.

In accordance with another aspect, the method 1000 can further include a step 1700 of configuring a controller 52 in operable communication with the valve 50 to move the valve 50 between the open state and the closed state.

In accordance with another aspect, the method 1000 can further include a step 1800 of configuring a temperature sensor 54 in operable communication with the controller 52 and configuring the controller 52 to move the valve 50 between the open state and the closed state in response to an environmental temperature sensed by the temperature sensor 54.

In accordance with another aspect, the method 1000 can further include a step 1900 of configuring a vent member 56 to carry and direct heat emitted from the light source 16, 116 to an external environment E outside the housing 14, 114 when the valve 50 is in the closed state, thereby maintaining and optimal temperature within the housing 14, 114 to optimally inhibit fogging, frosting and/or icing of the light-transmissive lens 18, 118.

Figure 9:
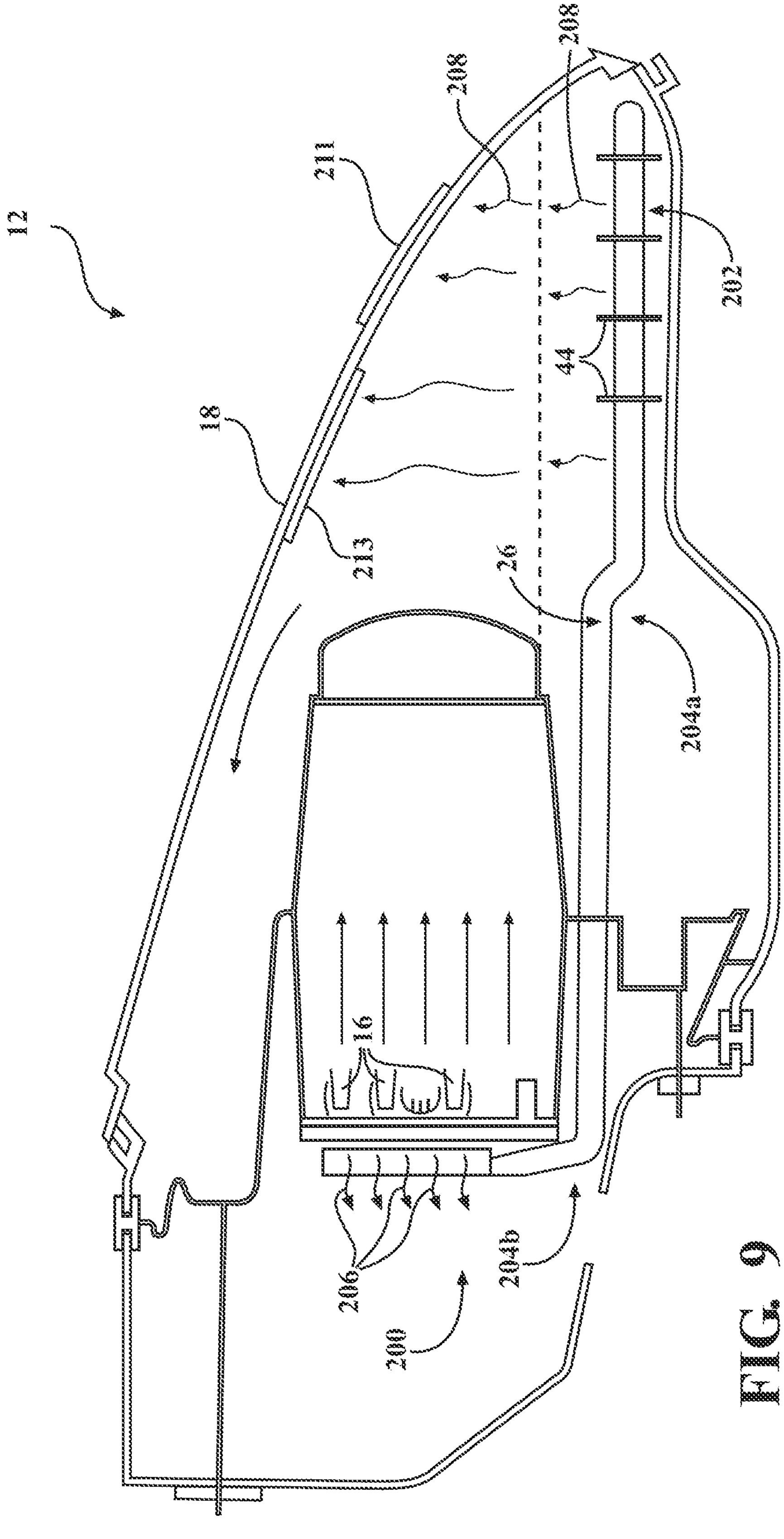
FIG. 9 illustrates a cross-sectional view of a motor vehicle light assembly illustrating the absorption of heat from a light source and the dissipation of heat towards a lens, in accordance with a non-limiting embodiment.
Figure 10:
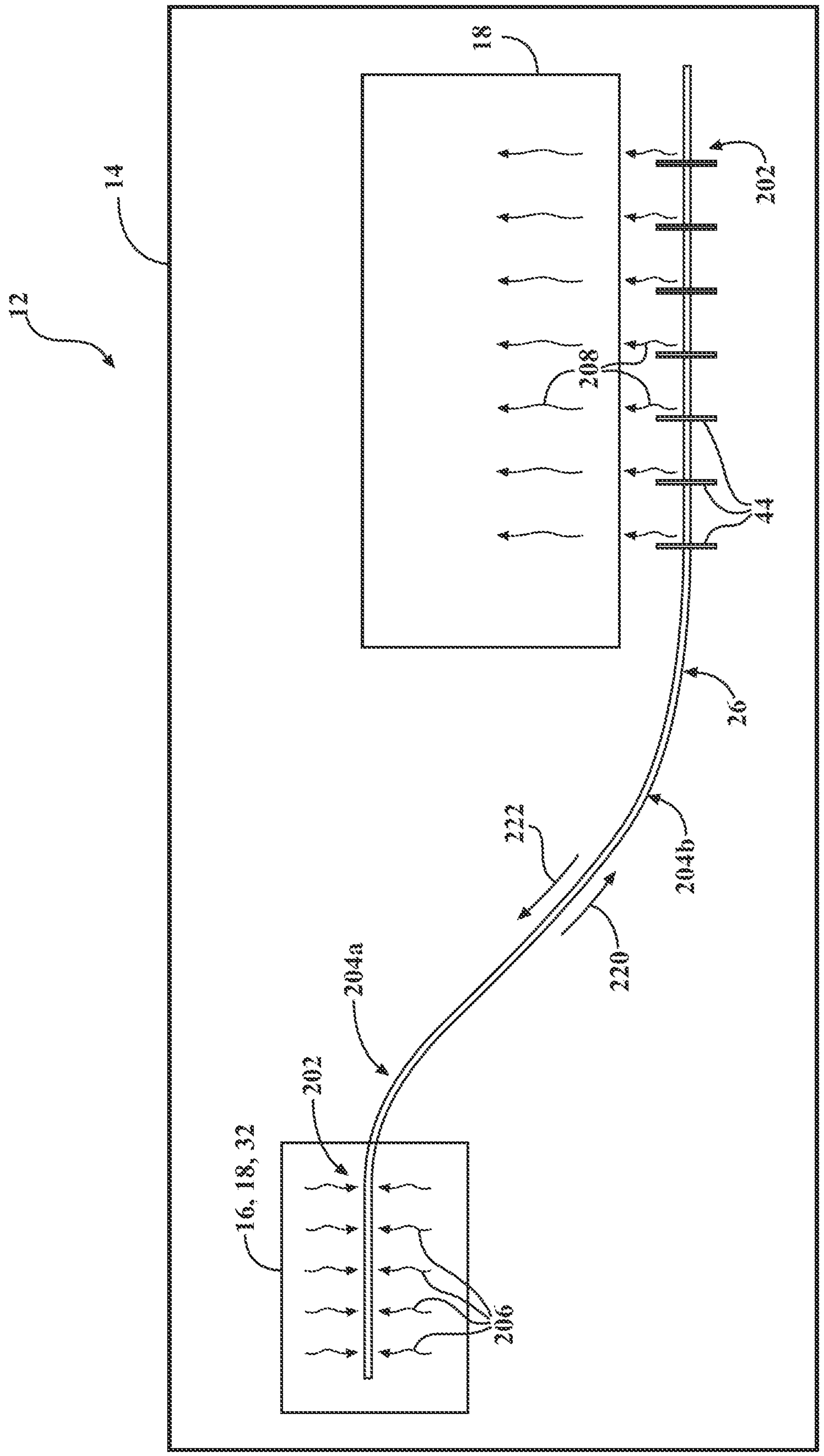
FIG. 10 illustrates an operational diagram of a heater member, in accordance with a non-limiting embodiment.

With reference to FIG. 10, there is illustrate the heater member 26 including a first end 200 disposed adjacent a heat source, such as the mount adaptor 32, the PCB 28, or adjacent the light source 16, and a second end 202 disposed adjacent a portion of the housing 14, such as lens 18, and a middle section 204 interconnecting the first end 200 and the second end 202. Middle section 204 can include bends, turns or curves 204*a*, 204*b* formed to be routed through the housing 14 cavity as required from the heat source (light source 16) to capture heat 206 from the heat source and to route the heat through the housing 14 to expel heat 208 to the desired area. Heat 208 transfers through from the second end 202 towards the lens 18 and may be further dissipated by radiator fins 44 mounted to the second end 202. With reference to FIG. 9, there is illustrated the position of the second end 202 below and adjacent the lens 18, illustrating the upwards propagation of heat 208 to heat the lens 18 to melt any ice 211 build-up or dissipate any condensation build up 213.

Figure 11:
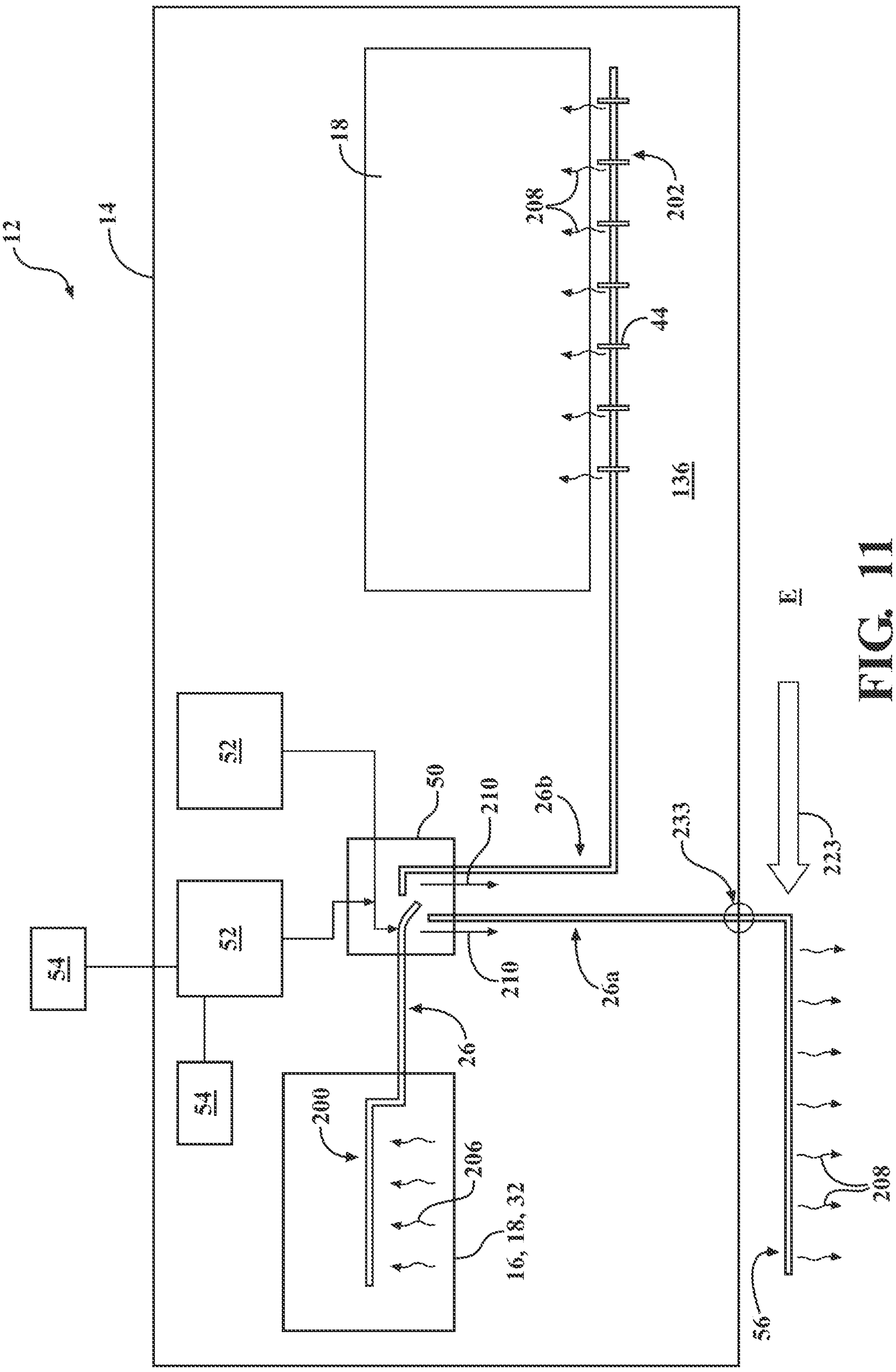
FIG. 11 illustrates an operational diagram of a heater member, in accordance with a non-limiting embodiment.
Figure 12:
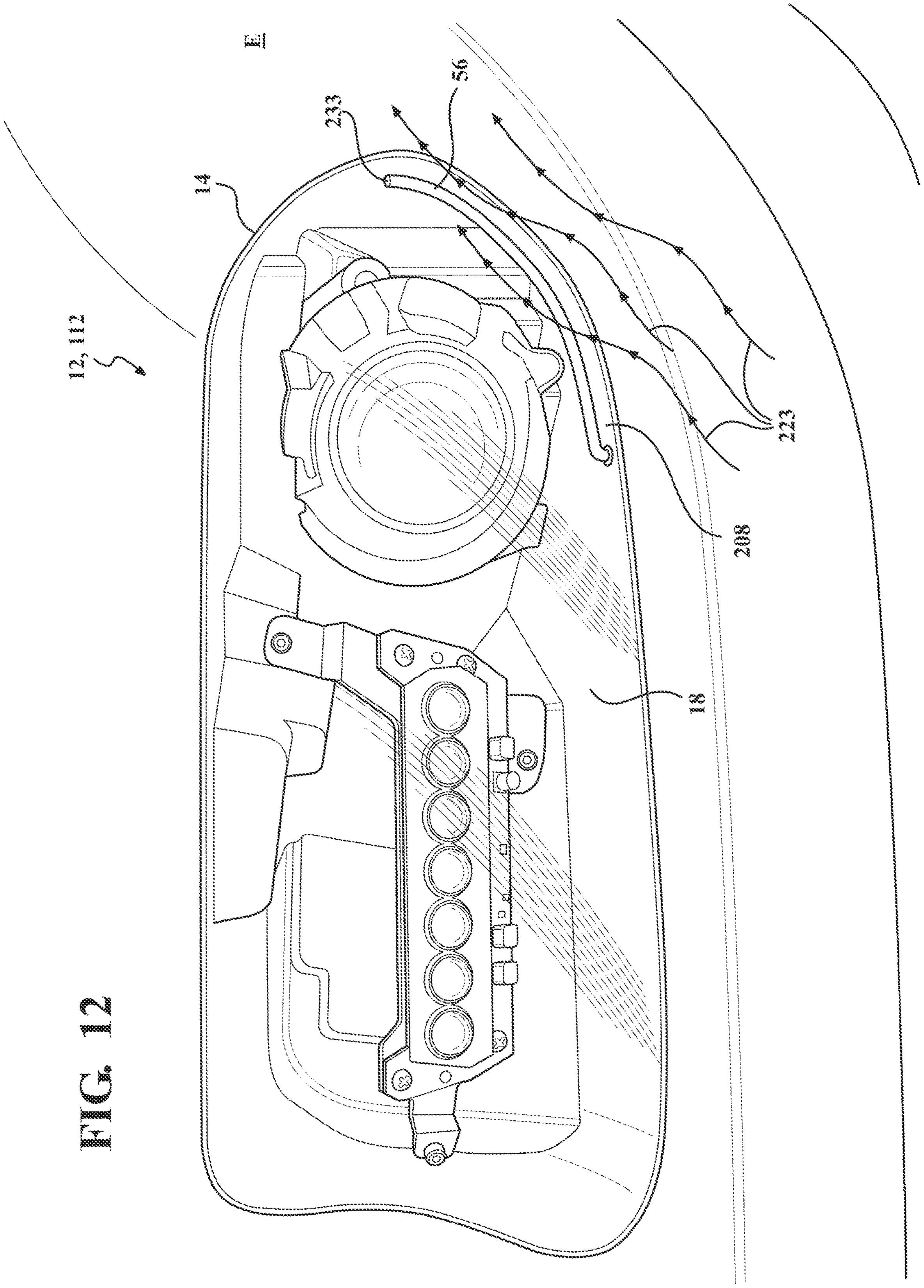
FIG. 12 illustrates an outer view of a light assembly illustrating a non-limiting embodiment of a vent member of a lens heater assembly.
Figure 15:
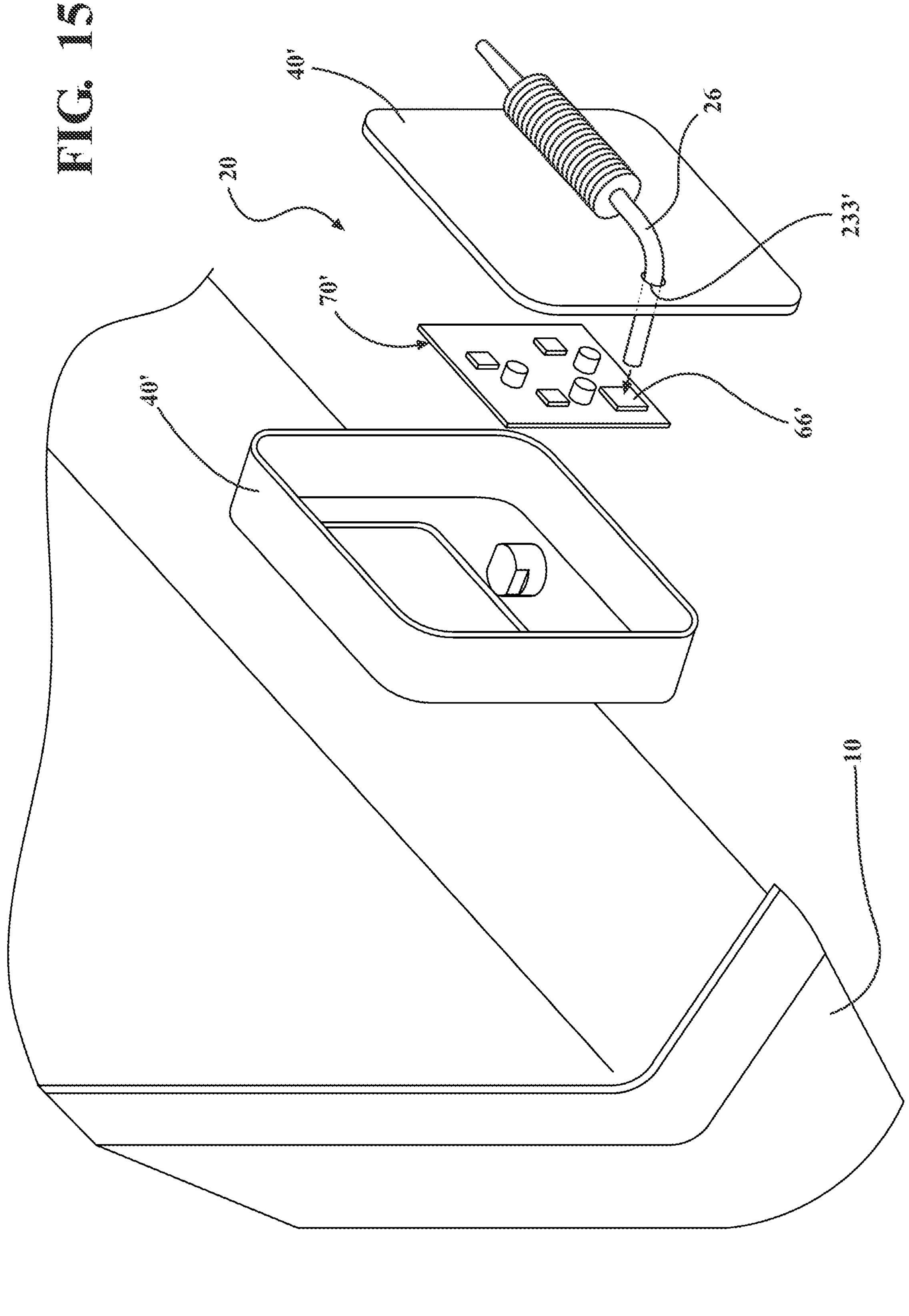
FIG. 15 illustrates an exploded view the electronic module of FIG. 14 housing a sensor and a heater member for thermally coupling to a source of heat as a sensor microprocessor, in accordance with an exemplary configuration of the teachings herein.
Figure 16:
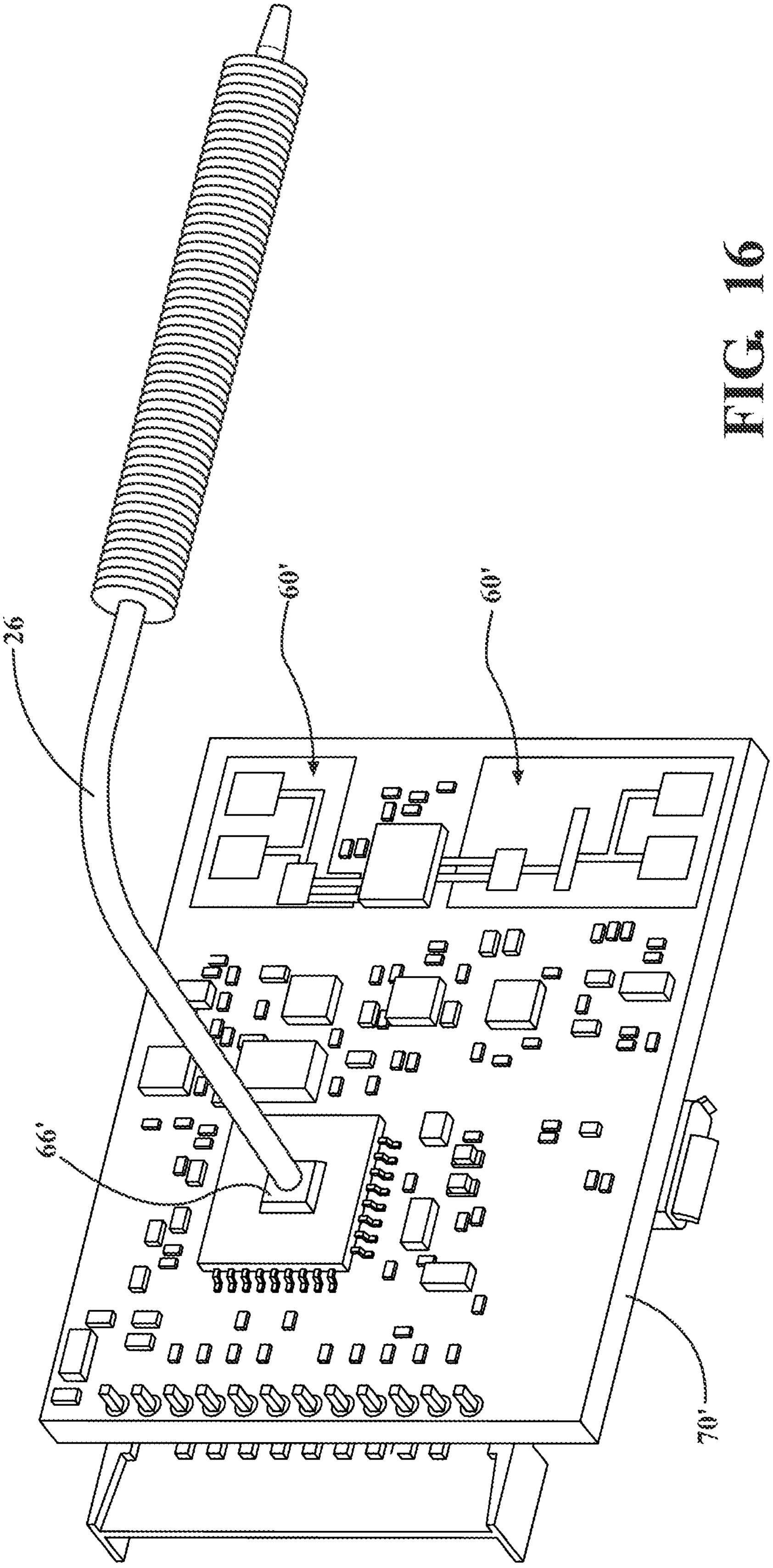
FIG. 16 illustrates a close up view of a radar sensor printed circuit board of the electronic module of FIG. 14 illustrating the heater member thermally coupled to a planar top of the radar microprocessor, in accordance with an exemplary configuration of the teachings herein.

With reference to FIGS. 11 and 12, valve 50 may be activated to cause fluid 210 to flow to an internal heater member 26*b* or towards external heater member 26*a* connected to vent member 56 based on the temperature of the housing. Valve 50 may be controlled by controller 52, or by a thermally activated mechanical switch 51 based on the temperature reached in the housing 14. In the event the housing 14 becomes over heated, which may damage or reduce performance of the LEDS 16 or other electrical components, such as for example in summer time, heat may be directed towards the exterior of the housing 14, where it may be dissipated to the environment E. Vent member 56 may be directly or indirectly exposed to the external environment E. For example as illustrated in FIG. 12, vent member 56 is exposed directly to the external environment E via a port 233 provided in the housing 14 to allow the internal heater member 26*b* to exit the housing 14, such that wind 223 may contact and assist with dissipating heat transferred to the vent member 56.

Now referring to FIGS. 13 to 16, in addition to FIGS. 1 to 12 there is shown a sensor assembly 20' equipped with the teachings described herein. The sensor assembly 20' may be employed as part of a gesture detection or obstacle detection system mounted to the vehicle 10, for example such as is described in commonly owned US Patent Application number US2019/0162822A1 entitled "Radar detection system for non-contact human activation of powered closure member", the entire contents of which are incorporated herein by reference. The sensor assembly is shown to include a housing 40', a sensor 20' disposed in the housing 40' and including a processor 66', for example mounted to a printed circuit board 70' configured for processing signals detected by the sensor 20', such that the processing (e.g. performing rapid signal processing calculations) causes the processor 66' to generate heat. The sensor assembly 20' further includes a heater member 26 disposed in, such as within an interior cavity of, the housing 40', the heater member 26 being routed to radiate heat generated by the processor 66' to an exterior of the housing 40' to regulate the temperature of processor 66' (e.g. assist with reducing the temperature of the processor 66'). In accordance with a related aspect, the sensor 20' is a radar sensor including transmit and receive antennas 60' coupled to the processor 66' and the processor 66' is configured for processing radar signals (e.g. by executing algorithms) detected by the antennas 60'. In a related aspect, the housing 40' is a sealed housing to protect the processor 66' and other electronics against ingress of exterior environmental conditions e.g. rain, moisture. As a result, the housing 40' is a sealed housing and not provided with open cooling ports, while the sealed heater member 26 routed through a sealed port 233' to radiate heat generated by the processor 66' to an exterior of the housing 40' can be sealed against the housing 40' to maintain the sealed integrity of the interior housing cavity.

It is recognized that the teachings herein may be applied for transferring heat generated by a motor vehicle electronic device, such as the herein above described light assembly 12, or also referred to as a light module, and the sensor assembly 20', or also referred to as a sensor module, to another part of the module, or to an external environment of the module. The heat member 26 described herein for transferring heat may be configured for coupling to the source of heat, such as for example and without limitation to a printed circuit board, a chip such as a microprocessor, drivers, FETS, LED chips, and the like, and may be routed to another area of the module, such as to another part of the housing or through the housing via a sealed port to an external environment of the housing.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sensor assembly for a motor vehicle, the sensor assembly comprising:

a housing;

a sensor disposed in the housing;

a processor disposed in the housing for processing signals output by the sensor during operation of the sensor assembly, wherein processing at the processor of the signals output by the sensor causes the processor to generate heat;

a heater member disposed in the housing, the heater member configured to radiate heat generated by the processor to exterior of the housing to regulate the temperature of the processor;

wherein the heater member comprises an elongated portion having an outer wall and an internal cavity;

wherein the elongated portion comprises a plurality of radiator fins extending radially outwardly from the outer wall;

wherein the heater member is openable and closeable responsive to temperature at the sensor assembly;

wherein, with the sensor assembly disposed at the motor vehicle, signals output by the sensor are processed at the processor to detect movement of a body part of a person at the motor vehicle; and wherein, responsive to detecting, via processing at the processor of signals output by the sensor, movement of the body part of the person, a closure panel of the vehicle is moved.

2. The sensor assembly of claim 1, comprising a printed circuit board disposed in the housing, wherein the processor is disposed at the printed circuit board.

3. The sensor assembly of claim 2, wherein the sensor is disposed at the printed circuit board.

4. The sensor assembly of claim 1, wherein the sensor comprises a radar sensor having a plurality of transmit antennas and a plurality of receive antennas, and wherein the processor processes radar signals received from the receive antennas.

5. The sensor assembly of claim 1, wherein the housing comprises a port, and wherein the elongated portion is routed through the port of the housing.

6. The sensor assembly of claim 1, comprising a fluid within the internal cavity of the elongated portion of the heater member.

7. The sensor assembly of claim 1, wherein the heater member is opened responsive to the temperature at the sensor assembly being above a threshold level.

8. The sensor assembly of claim 7, wherein, when the heater member is opened, heat is free to flow into the internal cavity of the elongated portion, and wherein, when the heater member is closed, heat is inhibited from flowing into the internal cavity of the elongated portion.

9. The sensor assembly of claim 8, wherein a controller is operable to open and close the heater member.

10. The sensor assembly of claim 9, wherein the controller adjusts a valve responsive to a temperature sensor that senses the temperature at the sensor assembly.

11. The sensor assembly of claim 1, wherein the plurality of radiator fins are configured in discrete groups spaced from one another along the outer wall of the heater member.

12. The sensor assembly of claim 11, wherein at least some of the discrete groups include a plurality of the radiator fins spaced from one another by a first distance, and wherein adjacent ones of the discrete groups are spaced from one another by a second distance greater than the first distance.

13. The sensor assembly of claim 1, wherein the outer wall of the heater member is formed of a first type of material and the plurality of radiator fins is formed of a second type of material, wherein the first type of material and the second type of material are different.

14. A sensor assembly for sensing at a rear portion of a motor vehicle, the sensor assembly comprising:

a housing;

a sensor disposed in the housing, wherein the sensor comprises a radar sensor having a plurality of transmit antennas and a plurality of receive antennas;

a processor disposed in the housing for processing radar signals received from the receive antennas during operation of the sensor assembly, wherein processing at the processor of the radar signals received from the receive antennas causes the processor to generate heat;

a heater member disposed in the housing, the heater member configured to radiate heat generated by the processor to exterior of the housing to regulate the temperature of the processor;

wherein the heater member comprises an elongated portion having an outer wall and an internal cavity;

wherein the elongated portion comprises a plurality of radiator fins extending radially outwardly from the outer wall;

wherein the heater member is openable and closeable responsive to temperature at the sensor assembly;

wherein, with the sensor assembly disposed at a rear portion of the motor vehicle, radar signals received from the receive antennas are processed at the processor to detect movement of a body part of a person at the rear portion of the motor vehicle; and wherein, responsive to detecting, via processing at the processor of radar signals received from the receive antennas, movement of the body part of the person, a rear liftgate of the vehicle is moved.

15. The sensor assembly of claim 14, wherein the plurality of radiator fins are configured in discrete groups spaced from one another along the outer wall of the heater member.

16. The sensor assembly of claim 14, wherein the outer wall of the heater member is formed of a first type of material and the plurality of radiator fins is formed of a second type of material, wherein the first type of material and the second type of material are different.

17. A sensor assembly for a motor vehicle, the sensor assembly comprising:

a housing;

a printed circuit board disposed in the housing;

a sensor disposed at the printed circuit board, wherein the sensor comprises a radar sensor having a plurality of transmit antennas and a plurality of receive antennas;

a processor disposed at the printed circuit board for processing radar signals received from the receive antennas during operation of the sensor assembly, wherein processing at the processor of the radar signals received from the receive antennas causes the processor to generate heat;

a heater member disposed in the housing, the heater member configured to radiate heat generated by the processor to exterior of the housing to regulate the temperature of the processor;

wherein the heater member comprises an elongated portion having an outer wall and an internal cavity;

wherein the elongated portion comprises a plurality of radiator fins extending radially outwardly from the outer wall;

wherein the heater member is openable and closeable responsive to temperature at the sensor assembly;

wherein, with the sensor assembly disposed at the motor vehicle, radar signals received from the receive antennas are processed at the processor to detect movement of a body part of a person at the motor vehicle; and wherein, responsive to detecting, via processing at the processor of radar signals received from the receive antennas, movement of the body part of the person, a closure panel of the vehicle is moved.

18. The sensor assembly of claim 17, wherein the plurality of radiator fins are configured in discrete groups spaced from one another along the outer wall of the heater member.

19. The sensor assembly of claim 17, wherein the outer wall of the heater member is formed of a first type of material and the plurality of radiator fins is formed of a second type of material, wherein the first type of material and the second type of material are different.

* * * * *